July 30, 1968

W. R. DE HOLLANDER 3,394,997

METHOD OF PREPARING URANIUM DIURANATE

Filed April 12, 1965

INVENTOR.
WILLIAM R. DeHOLLANDER
BY
Christie, Parker & Hale
ATTORNEYS

July 30, 1968  W. R. DE HOLLANDER  3,394,997
METHOD OF PREPARING URANIUM DIURANATE
Filed April 12, 1965  2 Sheets-Sheet 2

United States Patent Office
3,394,997
Patented July 30, 1968

3,394,997
METHOD OF PREPARING URANIUM DIURANATE
William R. De Hollander, San Jose, Calif., assignor to General Electric Company, New York, N.Y., a corporation of New York
Filed Apr. 12, 1965, Ser. No. 447,360
8 Claims. (Cl. 23—346)

ABSTRACT OF THE DISCLOSURE

An improved process for making ammonium diuranate from uranium hexafluoride is disclosed. In this process, the uranium hexafluoride is hydrolyzed to form an aqueous solution of uranyl fluoride and a dilute aqueous solution of ammonium ion is added to the aqueous solution of uranyl fluoride to precipitate ammonium diuranate. Preferably, the dilute aqueous solution of ammonium ion has a molarity of up to about 1.2. The precipitated ammonium diuranate thus formed has excellent properties making it especially suitable for conversion to uranium dioxide for nuclear fuel use.

---

Figure 1A:
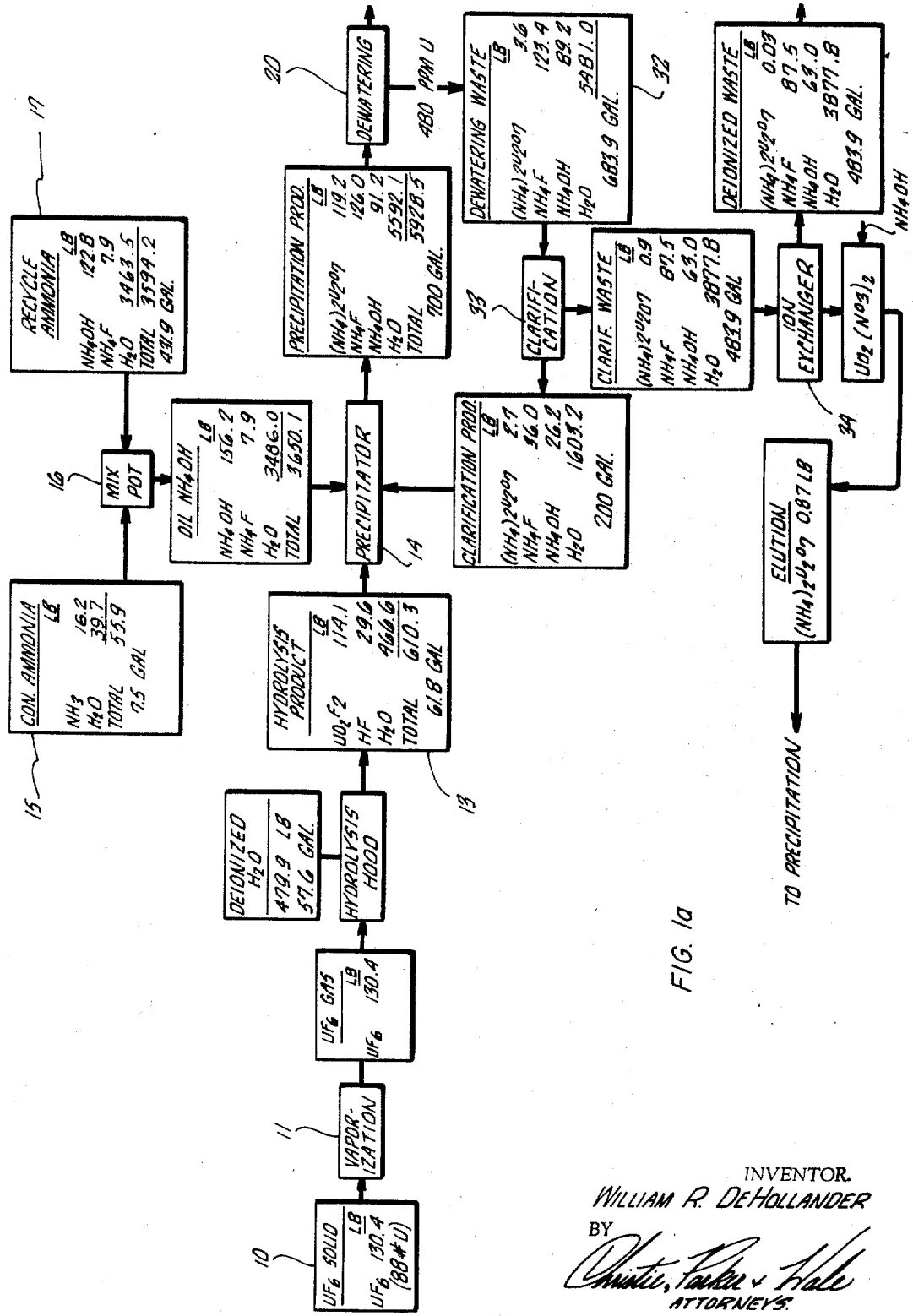

This invention relates to an improved method of preparing uranium dioxide, and more particularly to a novel method of precipitating uranium in a form of ammonium diuranate which can be quickly dried and processed to form uranium dioxide.

Uranium dioxide ($UO_2$) has been prepared in the past from uranium hexafluoride ($UF_6$) by reacting the $UF_6$ with water to hydrolyze the $UF_6$ and form a water solution of uranyl fluoride ($UO_2F_2$) and hydrofluoric acid (HF). In accordance with past practice, a concentrated solution of ammonia, say, 8 to 15 molar, is added to the uranyl fluoride solution to precipitate uranium as ammonium diuranate (($NH_4)_2U_2O_7$), which was dried, subjected to heat treatment in a defluorination furnace to drive off fluoride products, and convert the $(NH_4)_2U_2O_7$ to $UO_2$, which was further processed to a suitable physical form to serve as a nuclear fuel.

The uranium was precipitated as $(NH_4)_2U_2O_7$ with concentrated ammonia because it has been known that in a fluoride system the solubility of uranium is lowest when the ratio of ammonia to uranium is highest. As a consequence, it has been thought best practice in the past to conduct the precipitation step with the ammonia concentration as high as possible.

The use of concentrated ammonia produces a

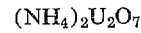

precipitate which is slimy and difficult to dewater and dry. Such a precipitate requires lengthy dewatering and drying operations which add substantially to the cost of an already expensive product. The rate of dewatering and drying cannot be increased by merely increasing the size of the equipment used in the process because precautions must be taken throughout the process to eliminate the possibility of uranium accumulating in an amount above its critical mass, i.e., an amount at which a nuclear explosion would spontaneously occur. Consequently, the manufacture of uranium dioxide has been seriously restricted by the unsatisfactory nature of the $(NH_4)_2U_2O_7$ precipitate with concentrated ammonia.

In accordance with this invention, the rate of uranium dioxide production is substantially increased by precipitating the uranium as $(NH_4)_2U_2O_7$ with a dilute aqueous solution of ammonia, i.e., substantially less than 2 molar. Precipitation with the dilute aqueous ammonia produces a $(NH_4)_2U_2O_7$ precipitate which is relatively crystalline and granular so that it dewaters and dries rapidly compared to the slimy precipitate formed when concentrated aqueous ammonia is used, as in the past.

The $(NH_4)_2U_2O_7$ precipitated in accordance with this invention can be dewatered and dried almost twice as fast as the precipitate formed with concentrated aqueous ammonia. Moreover, this increased rate of dewatering and drying is obtained without changing or increasing the size of the equipment used in the process. This, of course, results in a substantial reduction in the cost of producing uranium dioxide, which is the final product.

In the preferred method of this invention, the

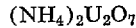

precipitated with dilute aqueous ammonia solution is dewatered in a first centrifuge. The underflow from the centrifuge is passed to a dryer and then heat-treated to form $UO_2$. The overflow from the first centrifuge is subjected to a second centrifuge operation. The underflow from the second centrifuging step is returned to the precipitation point of the process, and the overflow from the second centrifuging step is subjected to ion exchange to remove substantially all of the dissolved uranium. Thus, there is no significant loss of uranium due to its increased solubility in the process of this invention which uses a relatively low ammonia to uranium ratio to obtain a better precipitate of $(NH_4)_2U_2O_7$.

The deionized liquid waste from the ion exchange step is a substantial volume of water, and it carries a significant amount of fluoride and dilute aqueous ammonia. Accordingly, it is preferably treated with hydrated lime ($Ca(OH)_2$) which precipitates the fluoride as calcium fluoride ($CaF_2$). A small amount of uranium is also precipitated as calcium uranate ($CaU_2O_7$). The lime slurry waste is passed through a thickener where $CaU_2O_7$ and $CaF_2$ settle as a sludge with a small amount of ammonium fluoride ($NH_4F$) and ammonium hydroxide ($NH_4OH$). The settled sludge is put in drums and sent to waste burial. The effluent from the thickener has a significant amount of ammonium hydroxide with a smaller amount of ammonium fluoride, and traces of $CaU_2O_7$ and $CaF_2$. The effluent from the thickener is used to dilute concentrated ammonia, and form a dilute aqueous solution of ammonia which is then added to the precipitation step to precipitate more $(NH_4)_2U_2O_7$. The reuse of the effluent to dilute concentrated ammonia has the additional advantage of reducing waste disposal problems because the reused water was discarded in the prior-art process.

The hydrated lime is added to the ionized waste in less than the stoichiometric amount required to precipitate all of the fluoride in the deionized waste. This is to avoid carrying excess calcium with the thickener overflow back to the precipitation step. An excess amount of calcium in a fluoride system produces a cloudy solution in the precipitation step, and makes clarification and clean separation of the precipitate difficult. Moreover, excess calcium will react with uranyl fluoride in the precipitation step to form calcium uranate ($CaU_2O_7$), which will not decompose to form the desired final product of uranium dioxide.

Figure 1B:
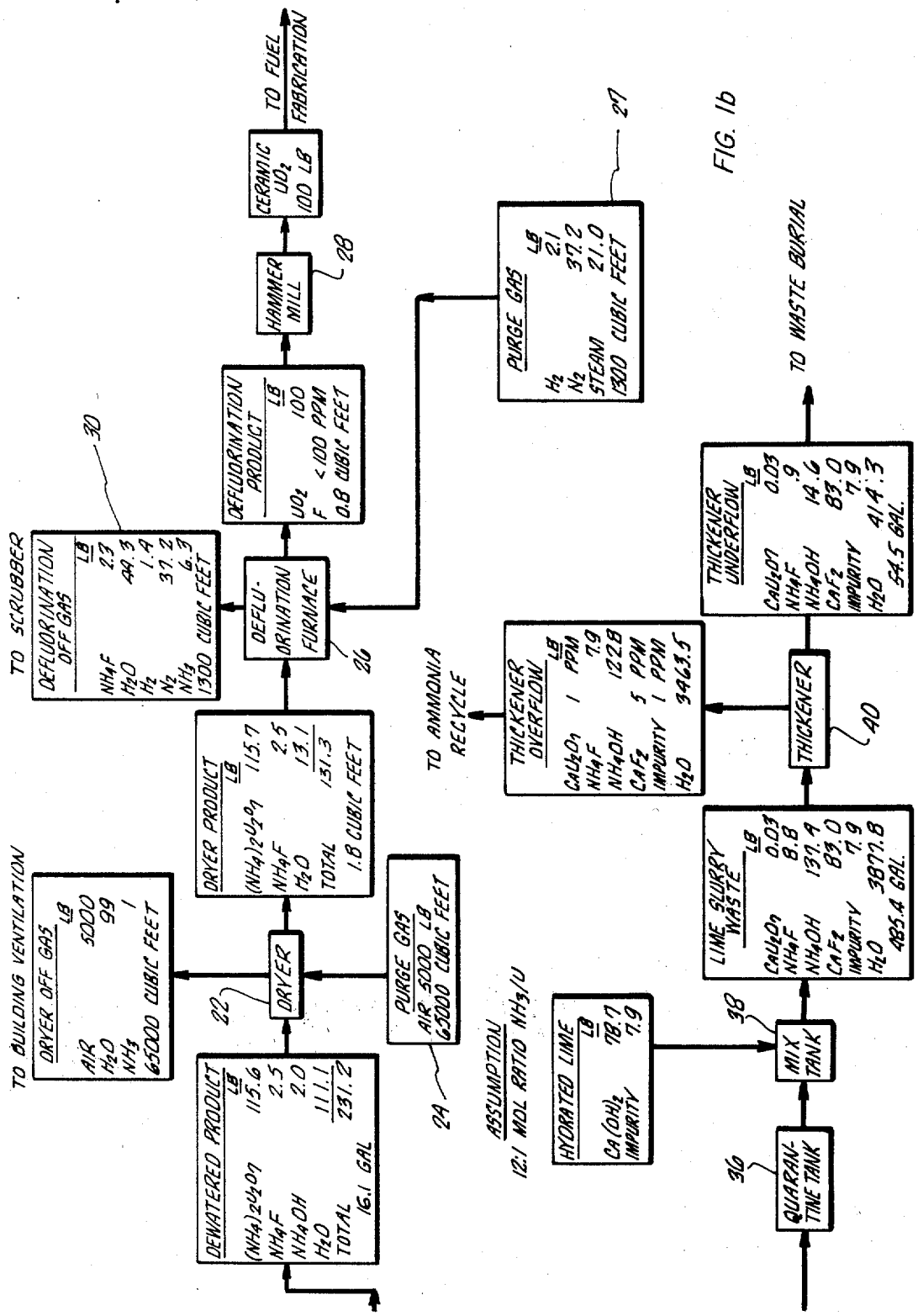

These and other aspects of the invention will be more fully understood from the following detailed description and the accompanying drawing wherein FIGURES 1a and 1b taken together show a flow sheet, which shows a material balance on the process for the manufacture of 100 pounds of $UO_2$.

Referring to the flow sheet, a cylinder 10 of solid uranium hexafluoride ($UF_6$), enriched in $U_{235}$, is electrically heated in vented hood 11 to a temperature between about 100° C. and about 250° C. to form $UF_6$ gas, which is bubbled into a pool of deionized water held in a plastic tank 12 in a vented hood. The $UF_6$ is hydrolyzed to form an aqueous solution of uranyl fluoride ($UO_2F_2$), and hydrofluoric acid (HF). Following hydrolysis, the $UO_2F_2$ solution is transferred to an unhooded storage tank 13 from where it is pumped to a plastic precipitator chamber 14. The precipitator is a relatively low-volume tank which serves only to insure complete mixing and blending.

Concentrated aqueous ammonia (about 15 molar) from a tank is thoroughly mixed in a mixing pot 16 with recycled ammonia solution (described in detail below) from a recycle storage tank 17. The mixture is then added as a dilute aqueous ammonia solution to the plastic precipitator chamber where the uranium is precipitated as ammonium diuranate ($(NH_4)_2U_2O_7$).

The ammonia must be in a dilute aqueous solution when it is added to the precipitator to avoid forming the undesirable slimy type of precipitate which results when concentrated ammonia is added to the $UO_2F_2$ solution. In general, the dilute aqueous ammonia solution added to the precipitator is preferably 1 molar or less, although slightly higher concentrations, say, up to 1.2 molar, can be used. In any event, the concentration should be well below 2 molar. A good operating range is between .7 molar and 1.0 molar. Even more dilute solutions of ammonia can be used, but they become impractical because of the increase required in tank sizes. A good rule of thumb for the process is to keep the uranium concentration in the hydrolysis storage tank more than about .2 pound per gallon and up to about 2 pounds per gallon, which is the upper solubility limit of the uranium.

The slurried $(NH_4)_2U_2O_7$ solution is then pumped to a stainless steel surge tank 18 for an intermediate hold period to allow optimum crystal growth. The holding period may range from about 5 minutes to 1½ hours. The slurry of $(NH_4)_2U_2O_7$ crystals is then transferred to a first dewatering basket centrifuge 20 with an internal scraper.

The $(NH_4)_2U_2O_7$ precipitated with the dilute aqueous ammonia solution is relatively crystalline or granular compared to the slimy precipitate formed when concentrated aqueous ammonia is used, and therefore dewaters relatively fast and cleanly in the first centrifuge to a paste with about 45% water by weight. The dewatered precipitate is moved by the internal scraper in the first centrifuge onto a continuous belt in a tunnel-type dryer 22 heated by infrared lamps. The maximum temperature which the $(NH_4)_2U_2O_7$ reaches in the dryer is about 350° C. A blower 24 forces air through the dryer to purge water vapor and a trace of ammonia from the dryer. Because of the relatively thorough dewatering of the $(NH_4)_2U_2O_7$, and its relatively good granular or crystalline physical characteristic, the precipitate is rapidly dried to 5 or 10% water content.

The dried $(NH_4)_2U_2O_7$ is discharged from the dryer belt into a hopper which feeds either directly into a rotary-type defluorination reduction furnace, or into boats which are stoked manually through a muffle-type defluorination reduction furnace 26. In the defluorination furnace, the $(NH_4)_2U_2O_7$ is heated to between about 700° C. and about 1,000° C. to decompose the $(NH_4)_2U_2O_7$ into solid $UO_2$ and gaseous ammonia ($NH_3$). The defluorination furnace is purged from a supply 27 with a gas containing hydrogen, nitrogen, and steam in the amount indicated on the flow sheet.

The temperature in the defluorination furnace must be a compromise. If the temperature is too hot, the $UO_2$ powder has poor ceramic quality, i.e., it will not sinter to form a uniform high-density pellet. If the temperature in the furnace is too low, too much fluorine is left in the $UO_2$ powder unless the product is retained in the furnace for an inordinate time to reduce the fluorine to an acceptable level. An excess amount of fluorine in the $UO_2$ results in a chemical attack on the fuel cells in which the $UO_2$ is packaged. Thus, it is advantageous to enter the defluorination furnace with as little fluorine in the $(NH_4)_2U_2O_7$ as possible, and, as described below, this is held to a minimum by treating the deionized waste water with hydrated lime in an amount close to, but below, stoichiometric amounts of calcium to precipitate fluorine as calcium fluoride before returning the waste to the ammonia recycle.

The $UO_2$ from the defluorination furnace contains less than 100 p.p.m. fluorine, and is then pulverized in a hammer mill 28 to particle size between 1–2 microns, which is suitable for the manufacture of ceramic $UO_2$ nuclear fuel.

Off gas from the defluorination furnace carries $NH_4FH_2O$, $H_2$, $N_2$, and $NH_3$, and it is passed through a water-type scrubber 30 prior to being vented up a stack.

The aqueous overflow waste stream from the dewatering centrifuge 20 is accumulated in a storage tank 32, and includes some $(NH_4)_2U_2O_7$ and larger amounts of $NH_4F$ and $NH_4OH$ (aqueous ammonia). The aqueous waste stream is delivered to a second high-speed clarification centrifuge 33 where most of the $(NH_4)_2U_2O_7$ is removed as an underflow and returned to the precipitator along with some $NH_4F$, $NH_4OH$ and water as indicated on the flow diagram.

The clarified aqueous waste stream overflow from the clarification centrifuge is passed through an ion exchanger 34 which removes most of the dissolved $(NH_4)_2U_2O_7$, which is then recovered as $UO_2(NO_3)_2$ when the ion exchanger is regenerated with nitric acid. Thereafter, the $UO_2(NO_3)_2$ is mixed with $NH_4OH$ to precipitate $(NH_4)_2U_2O_7$, which is subsequently treated to form $UO_2$.

Deionized waste water from the ion exchanger is pumped batchwise into a quarantine tank 36 which is dimensioned to hold less than a critical amount of uranium under the most adverse conditions. The deionized waste is subjected to colorimetric analysis to insure that only traces of uranium are present, and then mixed in a mixing tank 38 with hydrated lime which is added in less than the required stoichiometric amount to precipitate fluorine in the deionized waste as calcium fluoride. Preferably, the hydrated lime is added in the amount of about 90% of the fluorine equivalent to reduce the fluorine concentration from about 16 grams per liter to about 2 grams per liter.

The lime slurry waste is pumped into a thickener 40 where $CaF_2$ and a trace of $CaU_2O_7$ settle as a sludge with water and some $NH_4F$ and $NH_4OH$. The sludge is primarily $CaF_2$, and is put in drums and sent to waste burial.

The thickener overflow is primarily a dilute solution of aqueous ammonia, but carries traces of $CaU_2O_7$, $NH_4F$, and $CaF_2$. The thickener overflow is returned to the recycle ammonia tank 17, and mixed with additional concentrated ammonia to form the dilute aqueous ammonia solution used in the precipitator to precipitate more $(NH_4)_2U_2O_7$.

The process preferably is operated at a mol ratio of $NH_3$ to uranium of about 10 to 1, although the ratio can be as low as 7 to 1 or as high as 12 to 1. In general, the water to uranium ratio is about 3½ to about 5 gallons of water per pound of $UO_2$.

The process conducted in accordance with this invention produces a $(NH_4)_2U_2O_7$ precipitate which permitted the capacity of a plant of the type shown in the flow sheet to be almost doubled by the simple but highly effective innovation of conducting the precipitating step with dilute aqueous ammonia.

I claim:

1. The process for making ammonium diuranate from uranium hexafluoride comprising the steps of hydrolyzing the uranium hexafluoride to form an aqueous solution of uranyl fluoride, adding a dilute aqueous solution of ammonium ion having a molarity of up to about 1.2 to the aqueous solution of uranyl fluoride to precipitate ammonium diuranate, and thereafter dewatering the ammonium diuranate.

2. The process for making ammonium diuranate from uranium hexafluoride comprising the steps of hydrolyzing the uranium hexafluoride to form an aqueous solution of uranyl fluoride, adding a dilute aqueous solution of ammonium ion having a molarity of about 0.7 to 1 to the aqueous solution of uranyl fluoride to precipitate ammonium diuranate, and thereafter dewatering the ammonium diuranate.

3. The process for making ammonium diuranate from uranium hexafluoride comprising the steps of hydrolyzing the uranium hexafluoride to form an aqueous solution of uranyl fluoride, mixing water with concentrated ammonium hydroxide to form a dilute aqueous solution of ammonium ion having a molarity of up to about 1.2, adding the dilute aqueous solution of ammonium ion to the aqueous solution of uranyl fluoride to provide a mol ratio of $NH_3/U$ of between about 7 and about 12 and precipitate ammonium diuranate, and thereafter dewatering the ammonium diuranate.

4. The process for making ammonium diuranate from uranium hexafluoride comprising the steps of hydrolyzing the uranium hexafluoride to form an aqueous solution of uranyl fluoride in which the ratio of uranium to water is between about .2 pound per gallon and about 2 pounds per gallon, mixing water with concentrated ammonium hydroxide to form a dilute aqueous solution of ammonium ion having a molarity of about 0.7 to 1, adding the dilute aqueous solution of ammonium ion to the aqueous solution of uranyl fluoride to precipitate ammonium diuranate, and thereafter dewatering the ammonium diuranate.

5. The process for making ammonium diuranate from uranium hexafluoride comprising the steps of hydrolyzing the uranium hexafluoride to form an aqueous solution of uranyl fluoride, adding a dilute aqueous solution of ammonium ion having a molarity of up to about 1.2 to the aqueous solution of uranyl fluoride to precipitate ammonium diuranate, thereafter dewatering the ammonium diuranate precipitate in a dewaterer, subjecting the water removed from the ammonium diuranate to clarification to form an overflow and an underflow, and returning the underflow to the dewaterer.

6. The process for making ammonium diuranate from uranium hexafluoride comprising the steps of hydrolyzing the uranium hexafluoride to form an aqueous solution of uranyl fluoride, adding a dilute aqueous solution of ammonium ion having a molarity of up to about 1.2 to the aqueous solution of uranyl fluoride to precipitate ammonium diuranate, thereafter dewatering the ammonium diuranate precipitate in a dewaterer subjecting the water removed from the ammonium diuranate to clarification to form an overflow and an underflow, and passing the overflow through an ion exchanger to recover uranium from it.

7. The process for making ammonium diuranate from uranium hexafluoride comprising the steps of hydrolyzing the uranium hexafluoride to form an aqueous solution of uranyl fluoride and hydrogen fluoride, adding a dilute aqueous solution of ammonium ion having a molarity of up to about 1.2 to the aqueous solution of uranyl fluoride to precipitate ammonium diuranate, thereafter dewatering the ammonium diuranate precipitate in a dewaterer subjecting the water removed from the ammonium diuranate to clarification to form an overflow and an underflow, and adding calcium ions to the overflow to precipitate fluorine as calcium fluoride.

8. The process for making ammonium diuranate from uranium hexafluoride comprising the steps of: hydrolyzing the uranium hexafluoride to form an aqueous solution of uranyl fluoride and hydrogen fluoride, the uranium concentration being maintained at about 0.2 to 2 pounds per gallon; adding a dilute aqueous solution of ammonium ion having a molarity of up to about 1.2 to the aqueous solution of the uranyl fluoride in a precipitator to precipitate ammonium diuranate; transferring the ammonium diuranate slurry to a tank and holding the slurry there for about 5 to 90 minutes; thereafter dewatering the ammonium diuranate precipitate in a dewaterer; drying the ammonium diuranate precipitate at a temperature of up to about 350° C. to a water content of about 5 to 10 percent; subjecting the water removed from the ammonium diuranate to clarification to form an overflow containing fluoride ions and an underflow; adding calcium ions to the overflow in an amount up to about 90 percent of the stoichiometric amount of fluorine ions in the overflow to precipitate most of the fluorine ions as calcium fluoride; separating at least part of the overflow from the precipitated calcium fluoride; and returning the separated overflow to the precipitator.

References Cited
UNITED STATES PATENTS
2,906,598    9/1959    Googin _____ 23—355
3,272,602    9/1966    Suehiro et al. _____ 23—335

FOREIGN PATENTS
844,407    8/1960    Great Britain.

OTHER REFERENCES
Uranium Ore Processing, Clegg and Foley. Addison-Wesley Publishing Co., Reading, Mass., 1958, pp. 189, 190.

CARL D. QUARFORTH, *Primary Examiner.*

R. L. GRUDZIECKI, *Assistant Examiner.*